United States Patent [19]

Muta et al.

[11] E Re. 29,313

[45] Reissued July 19, 1977

[54] PITTING CORROSION RESISTANT AUSTENITE STAINLESS STEEL

[75] Inventors: Tohru Muta; Hideo Abo; Sakae Noguchi, all of Kitakyushu, Japan

[73] Assignee: Nippon Steel Corporation, Tokyo, Japan

[21] Appl. No.: 739,542

[22] Filed: Nov. 8, 1976

Related U.S. Patent Documents

Reissue of:

[64] Patent No.: 3,854,937
Issued: Dec. 17, 1974
Appl. No.: 207,021
Filed: Dec. 13, 1971

[30] Foreign Application Priority Data

Dec. 14, 1970 Japan ..... 45-110594

[51] Int. Cl.[2] ..... C22C 38/44; C22C 38/58

[52] U.S. Cl. ..... 75/128 A; 75/125; 75/128 C; 75/128 E; 75/128 F; 75/128 G; 75/128 N; 75/128 T; 75/128 W

[58] Field of Search ..... 75/125, 128 N, 128 T, 75/128 W, 128 A, 128 C, 128 E, 128 G

[56] References Cited

U.S. PATENT DOCUMENTS

| | | | |
|---|---|---|---|
| 2,839,392 | 6/1958 | Streicher | 75/128 N |
| 2,920,954 | 1/1960 | Mott | 75/128 N |
| 3,151,979 | 10/1964 | Carney | 75/128 N |
| 3,152,934 | 10/1964 | Lula | 75/128 A |
| 3,306,736 | 2/1967 | Rundell | 75/128 N |
| 3,567,434 | 3/1971 | Richardson | 75/128 N |
| 3,615,368 | 10/1971 | Baume | 75/128 N |
| 3,659,882 | 5/1972 | Souresny | 75/128 N |
| 3,716,353 | 2/1973 | Mimino | 75/128 N |

*Primary Examiner*—Arthur J. Steiner
*Attorney, Agent, or Firm*—Toren, McGeady and Stanger

[57] ABSTRACT

A pitting corrosion resistant austenite stainless steel comprising not more than 0.08% by weight of carbon, not more than 4% by weight of silicon, not more than 5.0% by weight of manganese, not more than 0.04% by weight of phosphorus, not more than 0.03% by weight of sulfur, 10 to 18% by weight of nickel, 23 to 30% by weight of chromium and 0.30 to 0.45% by weight of nitrogen, the balance being iron and unavoidable impurities, and satisfying the condition of Ni % + 30 (C % + N %) ≧ 20%.

1 Claim, 10 Drawing Figures

INVENTORS
TOHRU MUTA
HIDEO ABO
SAKAE NOGUCHI
BY Foren and McGeady
ATTORNEYS

INVENTORS

TOHRU MUTA
HIDEO ABO
SAKAE NOGUCHI

BY Fosen and McGrady
ATTORNEY

INVENTORS

TOHRU MUTA
HIDEO ABO
SAKAE NOGUCHI

BY Jones and McGeady
ATTORNEYS

INVENTORS
TOHRU MUTA
HIDEO ABO
SAKAE NOGUCHI

BY Toren and McGeady
ATTORNEYS

INVENTORS
TOHRU MUTA
HIDEO ABO
SAKAE NOGUCHI
BY Foren and McGrady
ATTORNEYS

PITTING CORROSION RESISTANT AUSTENITE STAINLESS STEEL

Matter enclosed in heavy brackets [ ] appears in the original patent but forms no part of this reissue specification; matter printed in italics indicates the additions made by reissue.

The present invention relates to an austenite stainless steel having excellent resistance against pitting corrosion.

One object of the present invention is to provide a stainless steel having excellent resistance against pitting corrosion as well as good hot and cold workability.

Another object of the present invention is to provide a stainless steel having excellent resistance against pitting corrosion as well as good weldability.

Still another object of the present invention is to provide a stainless steel having excellent resistance against pitting corrosion as well as high strength and toughness.

Pitting corrosion is one of the three remarkable defects of a stainless steel; the other two defects are stress corrosion cracking and grain boundary attack. There are available appropriate counter-measures against stress corrosion cracking and grain boundary attack; for example, stress relieving annealing for the former and stabilization by Nb and Ti or extremely low carbon content for the latter. But there is no effective counter-measure against pitting corrosion.

Many accidents due to pitting corrosion have been experienced in chemical plants and equipments, and demand for pitting corrosion resistant stainless steel is increasing and will increase as the ocean development progresses.

As metal materials which show strong resistance against pitting corrosion in the sea water, we can mention titanium and Hostelloy C (Ni: 55%, Cr: 16%, Mo: 16% and W: 4%). However, these materials are very precious and prohibited to be used in chemical equipments and sea applicances from the point of economy, and are rarely used in practical application.

Pitting corrosion [resistance] *resistant* stainless steels have been expected to overcome the economical hindrance of titanium and Hostelloy C, and some grades of sea-water stainless steels have been already published and commercialized. These sea-water stainless steels have a base composition of 25 Cr — 5 Ni — 1.5 Mo and a two-phase structure of austenite and ferrite. However, the ferrite phase contained in these sea-water stainless steels has a high chromium content which causes various problems in cold workings and welding. The ferrite of high chromium content is susceptible to 475° C embrittlement and $\sigma$-phase embrittlement, and even with an ordinary heat treatment these stainless steels tend to cause embrittlement, and cold workability of these steels is inferior to that of austenite stainless steels such as 18-8 stainless steel. Further, the ferrite of high chromium content is susceptible to micro-crackings due to heat cycles of welding, and such micro-crackings remain near weld bonds of heat affected zones and cause sometimes troubles.

In order to overcome the above-mentioned various difficulties of conventional pitting corrosion resistant (sea-water) stainless steels, the present inventors have conducted various extensive studies to develop a pitting corrosion resistant (sea-water) stainless steel having an austenite structure. As a result, the present inventors have found that pitting corrosion resistance is remarkably improved by the combined effects of chromium and nitrogen when chromium is contained in an amount more than 23% and nitrogen is contained in an amount more than 0.3%, and have completed the development of a pitting corrosion resistant (sea-water) stainless steel having an austenite structure in which nitrogen is made use of as a strong austenizer.

The basic composition of the present inventive stainless steel is:

| | |
|---|---|
| Cr: | 23 - 30% |
| Ni: | 10 - 18% |
| N: | 0.3 - 0.45% |

The following additional elements may be added in the specified ranges in single or in combination to further improve corrosion resistance:

| | |
|---|---|
| Mo: | 0.1 - 4% |
| Cu: | 0.2 - 5% |
| Nb: | 0.05 - 2% |

Also one or more of B, Ce and Ti may be added in the following ranges to further improve hot workability:

| | |
|---|---|
| B: | not more than 0.01% |
| Ce: | not more than 0.05% |
| Ti: | not more than 0.5% |

The present invention will be described in reference to the attached drawings.

Reasons for limitations of various components of the present inventive stainless steel will be explained hereinunder.

For estimation of pitting corrosion resistance of the present inventive stainless steel, the following three methods are used: a whole immersion test with a solution of ferric chloride (0.5 $FeCl_3$, 25° C, for 48 hrs.); a whole immersion test with a solution of ferric chloride and hydrochloric acid (50 g/l $FeCl_3$ + 1/20 N HCl, 50° C, for 48 hrs.) and measurement of potentials inducing pitting corrosions in a salt solution acidified with sulfuric acid (3% NaCl + 5% $H_2SO_4$, 35° C).

In connection with the whole immersion tests, less corrosion rate indicates better corrosion resistance, while in the measurement of the potentials, a pitting corrosion potential of more than 1.0 V.S.C.E. indicates that no pitting corrosion is caused in the medium.

Figure 1:
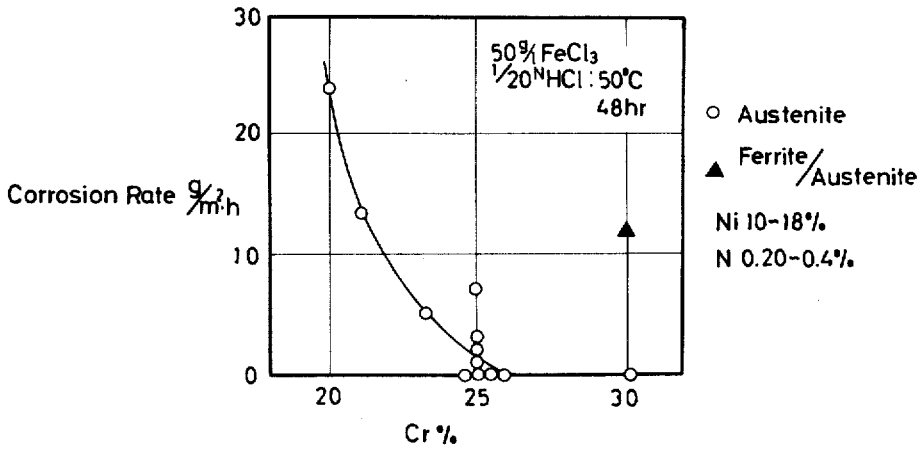
FIGS. 1 and 2 show respectively effects on pitting corrosion resistance of chromium contents.
Figure 2:
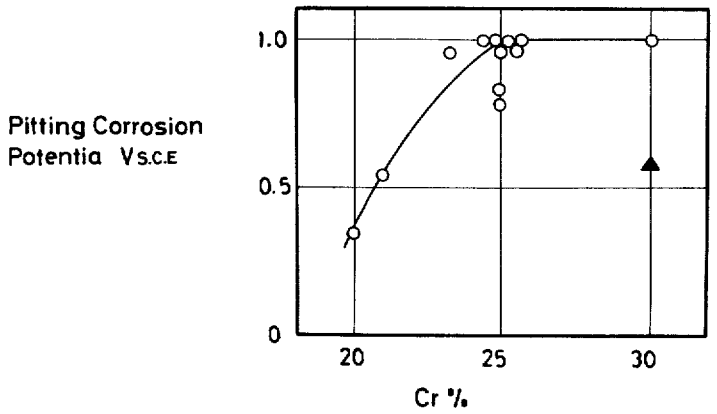

Chromium is a basic alloying element for stainless steels and effective for improving pitting corrosion resistance. From FIGS. 1 and 2, which show the effects on pitting corrosion resistance of chromium additions, it is understood that remarkable improvement of the pitting corrosion resistance is attained with chromium addition in the range of 20 – 25%, and it is also understood that subtantially no pitting corrosion is caused when chromium is added in an amount more than 23%, judging from the aspects of both the corrosion rate and the pitting corrosion potential. Therefore, in the present invention, the lower limit of the chromium content is set as 23%. Although an increased chromium content gives better pitting corrosion resistance, with a chromium content of 30% as shown by the triangle mark in FIGS. 1 and 2, a two-phase structure of ferrite and austenite appears in some grades, which deteriorates the pitting corrosion resistance. Further, from the aspect of workability, hot workability is deteriorated when the chromium content is more than 30%, and 475° embrittlement and $\sigma$ embrittlement occur more often in spite of the austenite base structure, thus damaging the hot and cold workabilities. For this reason the upper limit of the chromium content is set at 30% in the present invention.

Figure 3:
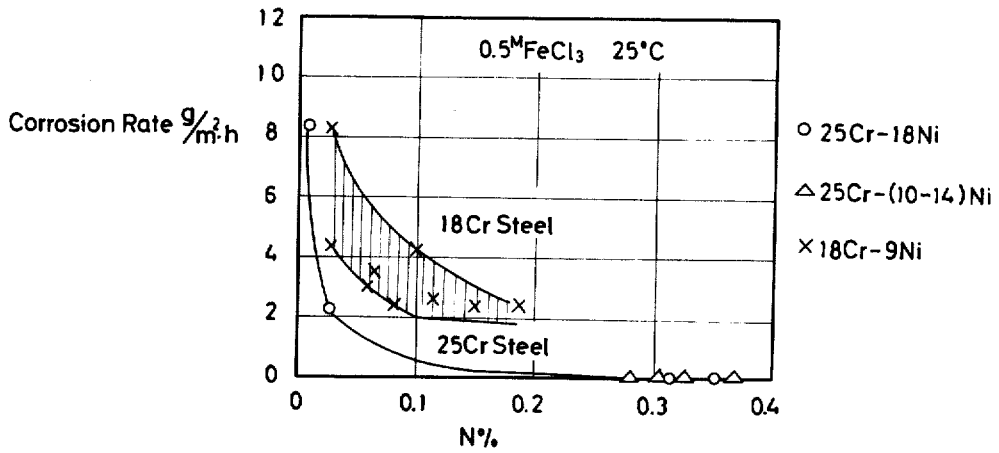
FIGS. 3 and 4 show effects on pitting corrosion resistance of chromium and nitrogen contents.
Figure 4:
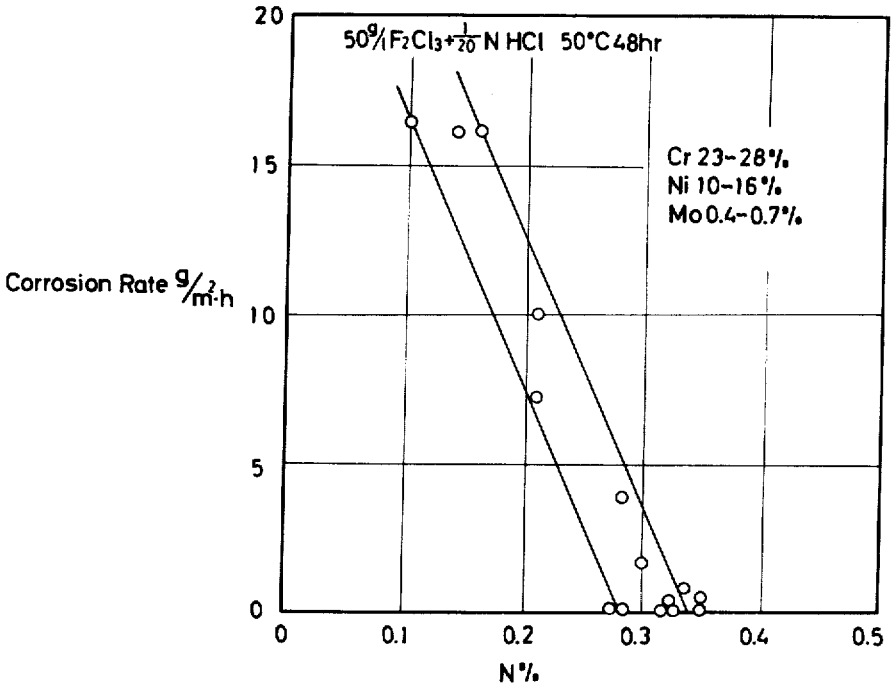

Nitrogen is one of the most important elements in the present inventive steel, and effective together with chromium for remarkably improving the pitting corrosion resistance. FIGS. 3 and 4 show the combined effects on pitting corrosion resistance [by] *of* chromium and nitrogen. Although nitrogen shows some improvement of pitting corrosion resistance with 18% chromium content, the corrosion rate does not decrease below a certain value even when nitrogen is increased and no effective prevention against pitting corrosion can be assured. However, when the chromium content reaches 25%, the effects on the improvement of pitting corrosion resistance of nitrogen become very remarkable, and as shown in FIG. 4 substantially no pitting corrosion is observed even by a more severe testing method when the nitrogen content exceeds 0.30%. For this reason, the lower limit of nitrogen content is set [as] *at* 0.30% in the present invention.

Figure 5:
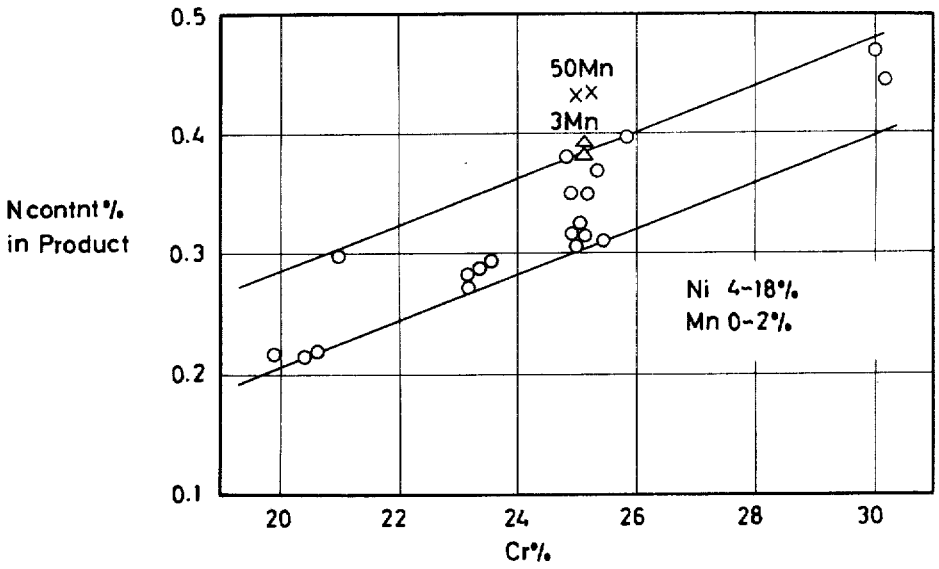
FIG. 5 shows effects on the amount of solid soluble nitrogen of chromium and manganese contents.

From the point of pitting corrosion resistance, an increased amount of nitrogen is desired, but since nitrogen is a gaseous component, the amount is limited by its solubility in the solid in order to prevent blow holes, which determines an upper limit of the nitrogen content. The amount of nitrogen in solid solution depends on the chromium content as shown in FIG. 5, and with a chromium content of 30%, the amount of solid soluble nitrogen is only 0.45%. Also the amount of solid soluble nitrogen can be increased by an increased content of manganese, but as understood from FIG. 5, 0.45% is the upper limit for nitrogen when the chromium content is 30% even when manganese is added in an amount of 5.0%. Chromium is limited up to 30% from the points of hot and cold workabilities and manganese is limited up to 5.0% from the aspects of pitting corrosion resistance and hot workability, so that the upper limit of the nitrogen content is 0.45% in the present invention.

Nickel is an essential element for assuring the austenite structure of the present inventive stainless steel, and is also effective for improving pitting corrosion resistance to some degree, and also is an essential element for attaining good hot workability in the present inventive stainless steel.

Figure 6:
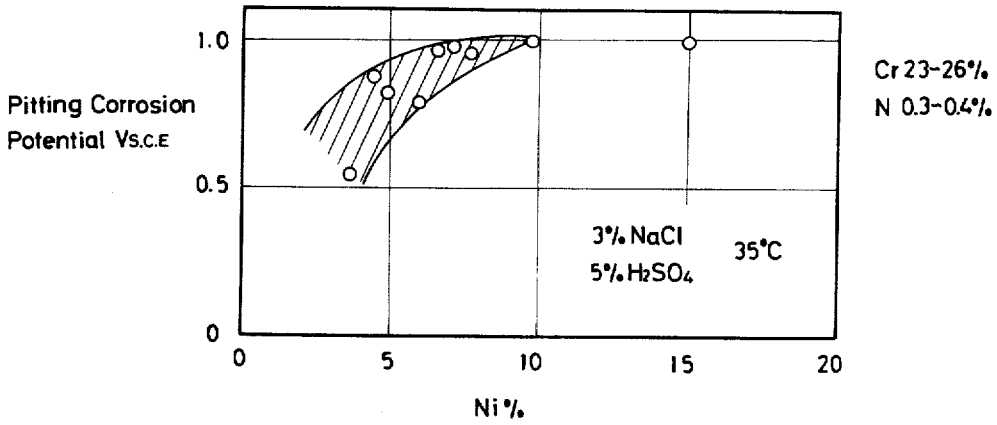
FIG. 6 shows effects on pitting corrosion resistance of nickel contents.

Effects on pitting corrosion resistance by nickel are shown in FIG. 6. With nickel contents more than 5%, the pitting corrosion potential becomes remarkably good, and no pitting corrosion whatever is observed with nickel contents in the range more than 10%. As mentioned above, nickel is essential for assuring the austenite base structure of the present inventive stainless steel, and the effects of nickel are considered to be explained by the following formula:

Equivalent Ni (%) = Ni + 0.5 Mn + 30 C + 30 N

Figure 7:
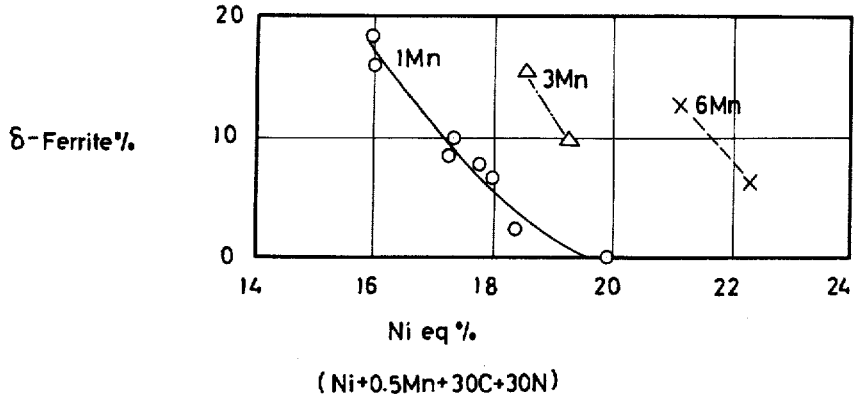
FIG. 7 shows influences on the structure of chemical compositions.

Results of measurements of δ-ferrite in the steel products according to the above formula are shown in FIG. 7. When the equivalent nickel is more than 19% the δ-ferrite disappears and an austenite structure is obtained. But as understood from FIG. 7, even if the equivalent nickel is increased by addition of manganese, the austenite structure cannot be obtained. Thus addition of manganese is of no use for obtaining an austenite structure. On the other hand, carbon and nitrogen are [stron] *strong* austenizers. As hereinafter stated, the upper limit of carbon content is [0.12%] *0.08%* because of its harmful effects on pitting corrosion resistance and resistance against intergranular attacks, and the upper limit of the nitrogen content is 0.45% from the point of its solid soluble limitation as mentioned before. Therefore, when carbon and nitrogen are added up to their upper limits, the equivalent nickel is 17% and the deficit of more than 2% may be supplemented by nickel addition. The lower limit of the nickel content has been explained from the points of pitting corrosion resistance and the structure, but in conclusion, 10% is the minimum amount of nickel for assuring the desired pitting corrosion resistance.

Figure 8:
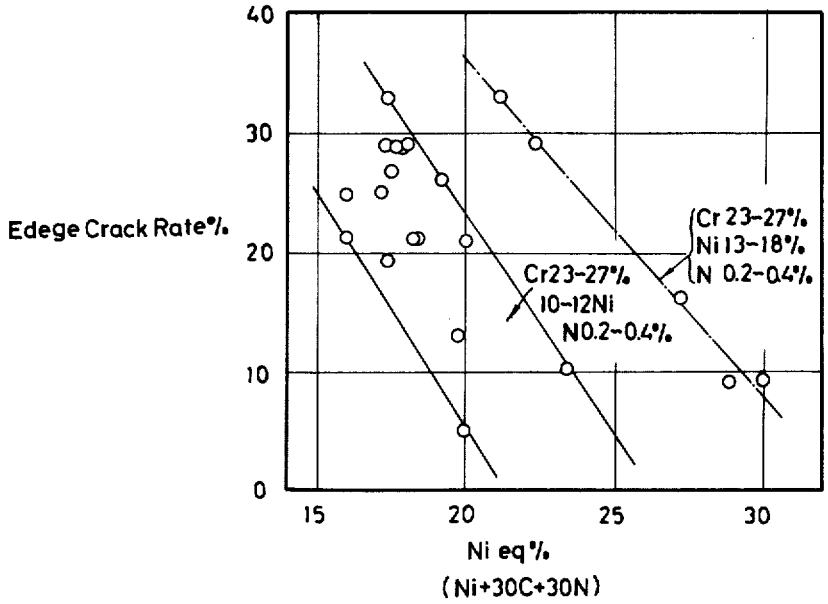
FIG. 8 shows influences on hot workability of chemical compositions.

On the other hand, the upper limit of the nickel content is determined from the point of hot workability which is one of the important properties of the present stainless steel. FIG. 8 shows the effects on the hot workability by various chemical compositions. The hot workability is estimated by the maximum edge cracking rate calculated from the maximum value of edge cracking depth of steel billets after hot rolling.

In FIG. 8, the hot workabilities of the grades containing 10–12% nickel and the grades containing 13–18% nickel are considerably different even when the equivalent nickel is the same. As understood from the figure, the hot workability tends to [improved] *improve* as the equivalent nickel is increased. However, at the border line of 12–13% nickel content, the hot workability is deteriorated when the nickel content is increased beyond the border line. This deterioration of hot working is due to hot embrittlement peculiar to highly alloyed steels, and can be alleviated by limiting the amounts of substitution type solid solution elements (Ni, Mo, Nb, Cr). Thus it is necessary to increase the equivalent nickel by the addition of nitrogen to assue Ni + 30 (C + N) $\geqq$ 20% and further to limit the additions of Mo and Nb, respectively, at less than 1%. Thus as for a desired range of nickel content, 12% is its upper limit within this desired range, but it is possible to improve the hot workability by increasing nitrogen addition and limiting the amount of Mo and Nb so [far] long as the nickel content is up to 18%. Thus the upper limit of the nickel content is set [as] *at* 18% in the present invention.

Both Mo and Nb are effective not only for improving the pitting corrosion resistance as well as Cr, N and Ni, but also Mo is effective for improving the resistance against sulfuric acid and Nb is effective for improving the resistance against intergranular attacks. For applications in chemical equipment and appliances, not only pitting corrosion resistance, but also ordinary corrosion resistance may be required. Thus Mo and Nb are sometimes added selectively for such purposes.

Figure 9:
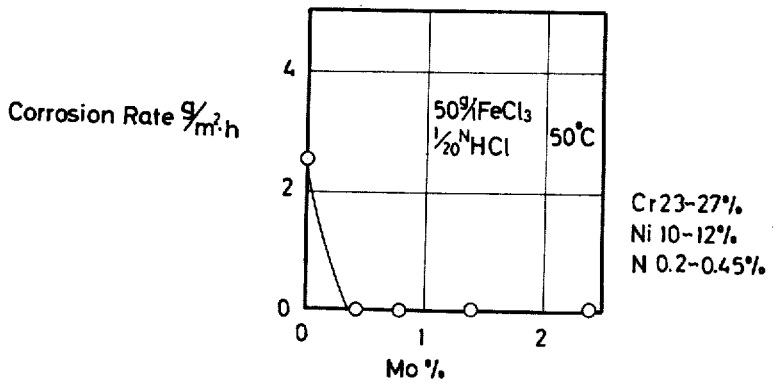
FIGS. 9 and 10 show effects on pitting corrosion resistance and sulfuric acid resistance of molybdenum contents.
Figure 10:
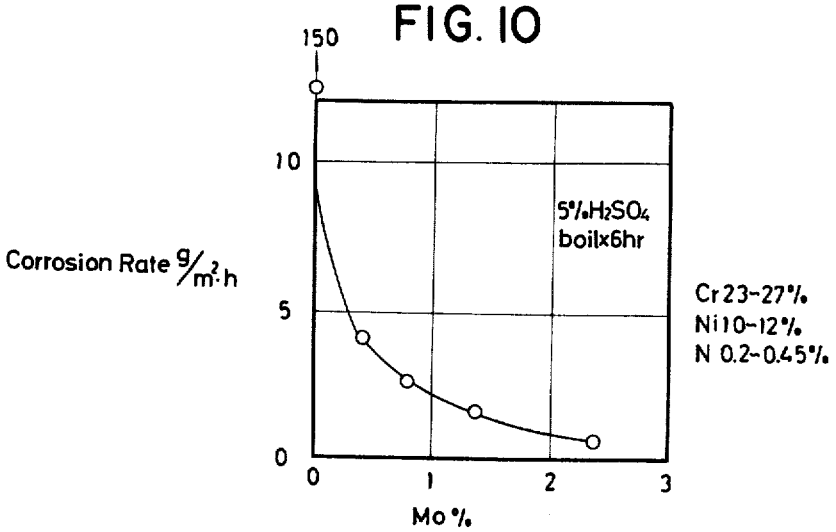

Mo contents in an amount more than 0.1% are required from the points of pitting corrosion resistance and sulfuric acid resistance as shown in FIGS. 9 and 10, and the lower limit of the Mo content is set [as] *at* 0.1%. Regarding Nb, at least 0.05% of Nb is required for pitting corrosion resistance and resistance against intergranular attacks, and the lower limit of Nb addition is set [as] *at* 0.05%.

A larger content of Mo is desirous from the points of pitting corrosion resistance and sulfuric acid resistance, but in order to maintain good hot workability as well as the austenite structure, the content of Mo is limited.

First, there is the complicated aspect that the effect of molybdenum on hot workability varies depending on the amount of nickel. When the nickel content is not more than 12%, good hot workability is obtained by adding Mo in a range not more than 4% with appropriate adjustment of the amounts of chromium and nitrogen. However, when the nickel content exceeds 12%, the hot embrittlement peculiar to highly alloyed steels appears and good hot workability is hard to maintain with an Mo addition more than 1%. Thus the upper limit of the molybdenum content must be limited in accordance with the following nickel contents:

(1) With nickel contents of 10% – 12% the upper limit of Mo is not more than 4%

(2) With nickel contents of 12% to 18% the upper limit of Mo is not more than 1%.

The upper limit of the Nb content is set as 2% in the present invention for the following reason: when the Nb content exceeds 2%, carbides and nitrides of niobium are produced in a large amount, thus deteriorating the pitting corrosion resistance, and in addition, fixation of carbon and nitrogen lowers the effective equivalent nickel so that it becomes more difficult to maintain the austenite structure.

Copper is not particularly effective for pitting corrosion resistance, but effective for ordinary corrosion resistance, such as, sulfuric acid resistance and hydrochloric acid resistance, and, similarly as Mo and Nb, it is desired to add copper according to the kinds and types of applications in which the steel is used. The reason for setting its lower limit at 0.2% is that at copper contents below this limit, no substantial improvement is obtained, while the reason for its upper limit of 5% is that copper contents of more than 5% remarkably deteriorate the hot workability because of an excess beyond the solid solution limit of copper.

Carbon not only deteriorates the pitting corrosion resistance, but also accelerates intergranular attacks remarkably and therefore it is limited to an upper limit of 0.08%.

Silicon is effective to improve the pitting corrosion resistance to some degree, but is less effective in this respect as compared with Cr, Mo and Nb. Since silicon is a strong ferrite former its content is limited from the point of maintenance of the austenite structure and its upper limit is set [as] *at* 4%.

Manganese is an element which lowers the pitting corrosion resistance, but it is useful in a limited amount of increasing the amount of solid soluble nitrogen and thus increasing the addition of nitrogen which is remarkably effective for improving the pitting corrosion resistance. With manganese contents beyond [6%] 5%, the deterioration of the pitting corrosion resistance increases too much in spite of the above favourable effects, and thus its upper limit is set [as] *at* [6%] 5%.

Both phosphorus and sulfur are elements which deteriorate pitting corrosion resistance and thus it is desirous to minimize their contents. But these elements are unavoidable impurities which are present during a steel making process. The reason for the upper limit of 0.040% for phosphorus is that phosphorus contents beyond this limit cause remarkable damage to weldability which is one of the most important properties of the present inventive steel. The reason for the upper limit of 0.030% for sulfur is that its contents beyond this limit deteriorates the hot workability as well as the weldability.

All of boron, cerium and titanium improve the hot workability of the present inventive steel, and it is desired to add these elements particularly when severe hot workings are conducted. Although these elements are effective in a very small addition, excessive addition of [those] *these* elements on the contrary damages the cleanness of the steel and deteriorates the hot workability. Thus the upper limits of B, Ce and Ti are set [as] *at* 0.01, 0.05 and 0.5% respectively.

Explanations have been made for the reasons of limitations of each of the constituents of the present inventive steel composition. Further it is necessary to limit the steel composition for balancing the composition from the points of the structure, hot workability and weldability as under:

$$10\% \leqq Ni < 12\%$$

$$\frac{Cr + Mo + Nb}{Ni + 30\,(C + N)} \leqq 1.3$$

$$12\% \leqq Ni \leqq 18\%$$

$$\frac{Cr + 3\,Mo + Nb}{Ni + 30\,(C + N)} \leqq 1.0$$

Examples of the present inventive steel are set forth in Table 1 with conventional standard grades of stainless steel for comparison, and their mechanical properties and corrosion resistance are set forth in Table 2.

Table 1

Examples of Present Steel Chemical Compositions

| Sample | | C | Si | Mn | Ni | Cr | N | Mo | Cu | Others |
|---|---|---|---|---|---|---|---|---|---|---|
| Inventive Steels | A | 0.06 | 0.65 | 1.28 | 10.1 | 23.5 | 0.35 | — | — | |
| | B | 0.05 | 0.70 | 1.43 | 15.2 | 25.6 | 0.36 | — | — | |
| | C | 0.06 | 0.62 | 1.18 | 10.9 | 24.7 | 0.35 | 0.8 | — | |
| | D | 0.07 | 0.66 | 1.52 | 11.7 | 23.4 | 0.31 | 2.4 | — | |
| | E | 0.04 | 0.73 | 1.04 | 16.2 | 26.3 | 0.38 | 0.5 | 0.4 | |
| | F | 0.06 | 0.65 | 1.22 | 11.4 | 23.2 | 0.32 | 1.4 | — | Nb 0.8 |
| | G | 0.05 | 0.61 | 1.64 | 14.8 | 25.3 | 0.34 | 0.7 | 1.2 | Nb 0.5 |
| | H | 0.05 | 0.64 | 4.87 | 10.6 | 15.8 | 0.43 | — | — | |
| | I | 0.06 | 3.04 | 1.10 | 13.8 | 23.5 | 0.37 | — | — | |
| Conventional | SUS 27 | 0.05 | 0.64 | 1.11 | 9.1 | 18.4 | 0.024 | — | — | |
| | SUS 32 | 0.06 | 0.70 | 1.34 | 13.2 | 17.1 | 0.022 | 2.4 | — | |

Table 1-continued

| Sample | | C | Si | Mn | Ni | Cr | N | Mo | Cu | Others |
|---|---|---|---|---|---|---|---|---|---|---|
| | | Examples of Present Steel Chemical Compositions | | | | | | | | |
| Steels | SUS 42 | 0.06 | 0.62 | 1.33 | 19.7 | 25.2 | 0.025 | — | — | |
| | SUS 64 | 0.05 | 0.68 | 1.42 | 14.2 | 18.7 | 0.023 | 3.3 | — | |

Table 2

| Sample | | Mechanical Properties and Corrosion Resistance | | | | | | |
|---|---|---|---|---|---|---|---|---|
| | | Tensile Properties | | | Bending Property | Pitting Corrosion Resistance | | Corrosion Resistance |
| | | Yield Strength kg/mm² | Tensile Strength kg/mm² | Elongation % | r: 0.5t 180° | Pitting Corrosion Potential VSCE (at 1mA/cm²) 3%NaCl + 5% $H_2SO_4$: 335° C | Corrosion Rate g/m².h 50g/l $FeCl_3$+1/20N HCl: 50° C | 5% $H_2SO_4$ boil × 6 hrs. g/m².h |
| Inventive Steels | A | 48.3 | 87.1 | 48.9 | good | 1.01 | 2.1 | 140 |
| | B | 42.9 | 80.5 | 46.8 | " | 0.99 | 0 | 59 |
| | C | 40.2 | 80.2 | 51.7 | " | 1.02 | 0 | 2.3 |
| | D | 47.8 | 83.6 | 48.8 | " | 1.02 | 0 | 0.8 |
| | E | 40.7 | 80.8 | 51.0 | " | 1.02 | 0 | 1.6 |
| | F | 55.4 | 90.9 | 40.0 | " | 1.02 | 0 | 1.8 |
| | G | 51.6 | 85.4 | 44.5 | " | 1.02 | 0 | 1.2 |
| | H | 55.8 | 91.3 | 39.8 | " | 0.96 | 3.2 | 135 |
| | I | 43.5 | 81.6 | 45.4 | " | 1.02 | 0 | 62 |
| Conventional Steels | SUS 27 | 26.5 | 59.5 | 63.6 | good | 0.36 | 17 | 206 |
| | SUS 32 | 25.7 | 54.9 | 61.7 | " | 0.81 | 12 | 40 |
| | SUS 42 | 25.3 | 56.6 | 64.8 | " | 0.54 | 6.9 | 27 |
| | SUS 64 | 28.0 | 60.1 | 54.0 | " | 0.93 | 5.5 | 3.7 |

What is claimed is:

1. A pitting corrosion resistant austenite stainless steel consisting essentially of

*not more than* 0.08% by weight of carbon, silicon in an amount not exceeding 4.0% by weight, manganese in an amount not exceeding 5.0% by weight, phosphorus in an amount not exceeding 0.04% by weight, sulfur in an amount not exceeding 0.03% by weight, 10 to 18% by weight of nickel, 23 to 30% by weight of chromium, 0.30 to 0.45% by weight of nitrogen, and 0.1 to 4.0% by weight of molybdenum, the balance being iron and unavoidable impurities, said steel satisfying the condition of Ni % + 30 (C % + N %) ≧ 20%.

* * * * *